(12) United States Patent
Wu (10) Patent No.: US 10,506,640 B2
(45) Date of Patent: Dec. 10, 2019

(54) DEVICE AND METHOD OF HANDLING SYSTEM INFORMATION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/846,230

(22) Filed: Dec. 19, 2017

(65) Prior Publication Data

US 2018/0176962 A1 Jun. 21, 2018

Related U.S. Application Data

(60) Provisional application No. 62/541,078, filed on Aug. 3, 2017, provisional application No. 62/437,060, filed on Dec. 21, 2016.

(51) Int. Cl.

| | |
|---|---|
| *H04W 12/06* | (2009.01) |
| *H04W 12/08* | (2009.01) |
| *H04W 74/08* | (2009.01) |
| *H04W 28/02* | (2009.01) |
| *H04W 72/14* | (2009.01) |
| *H04W 76/27* | (2018.01) |
| *H04W 48/14* | (2009.01) |
| *H04W 88/08* | (2009.01) |
| *H04W 48/12* | (2009.01) |

(52) U.S. Cl.
CPC ... *H04W 74/0833* (2013.01); *H04W 28/0278* (2013.01); *H04W 48/14* (2013.01); *H04W 72/14* (2013.01); *H04W 76/27* (2018.02); *H04W 48/12* (2013.01); *H04W 88/08* (2013.01)

(58) Field of Classification Search
CPC .................................................. H04W 74/0833
See application file for complete search history.

(56) References Cited

U.S. PATENT DOCUMENTS

| | | | | |
|---|---|---|---|---|
| 8,593,990 | B1 * | 11/2013 | Henttonen | G01R 31/08 455/73 |
| 9,271,323 | B2 * | 2/2016 | Nam | H04W 76/027 |
| 2012/0172063 | A1 * | 7/2012 | Lee | 455/458 |
| 2016/0219475 | A1 | 7/2016 | Kim | |

(Continued)

FOREIGN PATENT DOCUMENTS

| | | |
|---|---|---|
| WO | 2015/181259 A2 | 12/2015 |
| WO | 2016/198909 A1 | 12/2016 |

OTHER PUBLICATIONS

RAN #95, System Information Signaling Design in NR, Aug. 2016.*

(Continued)

*Primary Examiner* — Gary Lafontant
(74) *Attorney, Agent, or Firm* — Winston Hsu (57) ABSTRACT

A communication device of handling system information (SI) comprises a storage device for storing instructions and a processing circuit coupled to the storage device. The processing circuit is configured to execute the instructions stored in the storage device. The instructions comprise acquiring a first SI broadcasted by a base station (BS); initiating a first service after acquiring the first SI; transmitting a SI request to the BS to request a second SI, in response to initiating the first service; initiating a second service after acquiring the first SI; and stopping transmitting the SI request to the BS in response to initiating the second service.

18 Claims, 7 Drawing Sheets

(56) References Cited

U.S. PATENT DOCUMENTS

2016/0234736 A1 8/2016 Kubota
2016/0234759 A1 8/2016 Kubota
2018/0124601 A1* 5/2018 Vutukuri ............... H04W 12/06

OTHER PUBLICATIONS

RAN #95 Bis, System information for standalone NR deployment Oct. 2016.*
RAN #96, Discussion on Issues of Other Sis, Nov. 2016.*
Search Report dated May 9, 2018 for EP application No. 17208966.6, pp. 1-7.
Oppo, "Discussion on Issues of Other SIs", 3GPP TSG-RAN2 Meeting #96, R2-167480, Nov. 14-18, 2016, Reno, USA, XP051177396, pp. 1-4.
Institute for Information Industry (III), "Discussion on System Information Delivery in NR", 3GPP TSG RAN WG1 meeting #86bis, R1-1610207, Oct. 10-14, 2016, Lisbon, Portugal, XP051150226 ,pp. 1-5.
Samsung, "System Information Signalling Design in NR", 3GPP TSG-RAN WG2 Meeting #95, R2-164693, Aug. 22-26, 2016, Gothenburg, Sweden, XP051126466, pp. 1-6.
Intel Corporation, "System information for standalone NR deployment", 3GPP TSG-RAN WG2 Meeting #95bis, R2-166885, Oct. 10-14, 2016, Kaohsiung, XP051151325, pp. 1-5.
Office action dated Sep. 17, 2018 for the Taiwan application No. 106144992, filing date Dec. 21, 2017, pp. 1-26.

* cited by examiner

DEVICE AND METHOD OF HANDLING SYSTEM INFORMATION

CROSS REFERENCE TO RELATED APPLICATIONS

This application claims the benefit of U.S. Provisional Application No. 62/437,060, filed on Dec. 21, 2016, and No. 62/541,078, filed on Aug. 3, 2017, which are incorporated herein by reference.

BACKGROUND OF THE INVENTION

1. Field of the Invention

The present invention relates to a device and a method used in a wireless communication system, and more particularly, to a device and a method of handling system information.

2. Description of the Prior Art

A user equipment (UE) may request other system information (SI) from the network, after receiving some SI broadcasted by the network. However, it is unknown how (e.g., when) the UE requests the other SI from the network. Thus, communication performed with the other SI between the UE and the network may not be completed properly.

SUMMARY OF THE INVENTION

The present invention therefore provides a communication device and method for handling system information to solve the abovementioned problem.

A communication device of handling system information (SI) comprises a storage device for storing instructions and a processing circuit coupled to the storage device. The processing circuit is configured to execute the instructions stored in the storage device. The instructions comprise acquiring a first SI broadcasted by a base station (BS); initiating a first service after acquiring the first SI; transmitting a SI request to the BS to request a second SI, in response to initiating the first service; initiating a second service after acquiring the first SI; and stopping transmitting the SI request to the BS in response to initiating the second service.

A communication device of handling system information (SI) comprises a storage device for storing instructions and a processing circuit coupled to the storage device. The processing circuit is configured to execute the instructions stored in the storage device. The instructions comprise acquiring a first SI broadcasted by a base station (BS); initiating a SI request procedure with the BS to request a second SI, after acquiring the first SI; and not initiating a radio resource control (RRC) connection procedure, a data transmission or a random access (RA) procedure with the BS, when initiating the SI request procedure with the BS.

A communication device of handling system information (SI) comprises a storage device for storing instructions and a processing circuit coupled to the storage device. The processing circuit is configured to execute the instructions stored in the storage device. The instructions comprise acquiring a first SI broadcasted by a base station (BS); initiating a radio resource control (RRC) connection procedure, a data transmission or a random access (RA) procedure with the BS, after acquiring the first SI; and not initiating a SI request procedure with the BS to request a second SI, when initiating the RRC connection procedure, the data transmission or the RA procedure with the BS.

A communication device of handling system information (SI) comprises a storage device for storing instructions and a processing circuit coupled to the storage device. The processing circuit is configured to execute the instructions stored in the storage device. The instructions comprise acquiring a first SI broadcasted by a base station (BS); and initiating a SI request procedure with the BS to request a second SI when initiating a radio resource control (RRC) connection procedure, a data transmission or a random access (RA) procedure with the BS, after acquiring the first SI; or initiating the RRC connection procedure, the data transmission or the RA procedure with the BS when initiating the SI request procedure to request the second SI with the BS, after acquiring the first SI.

A communication device of handling system information (SI) comprises a storage device for storing instructions and a processing circuit coupled to the storage device. The processing circuit is configured to execute the instructions stored in the storage device. The instructions comprise acquiring a first SI broadcasted by a base station (BS) in a cell of the BS; determining that an access to the cell is barred; and initiating a SI request procedure to the cell of the BS to request a second SI, when the access to the cell is barred.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
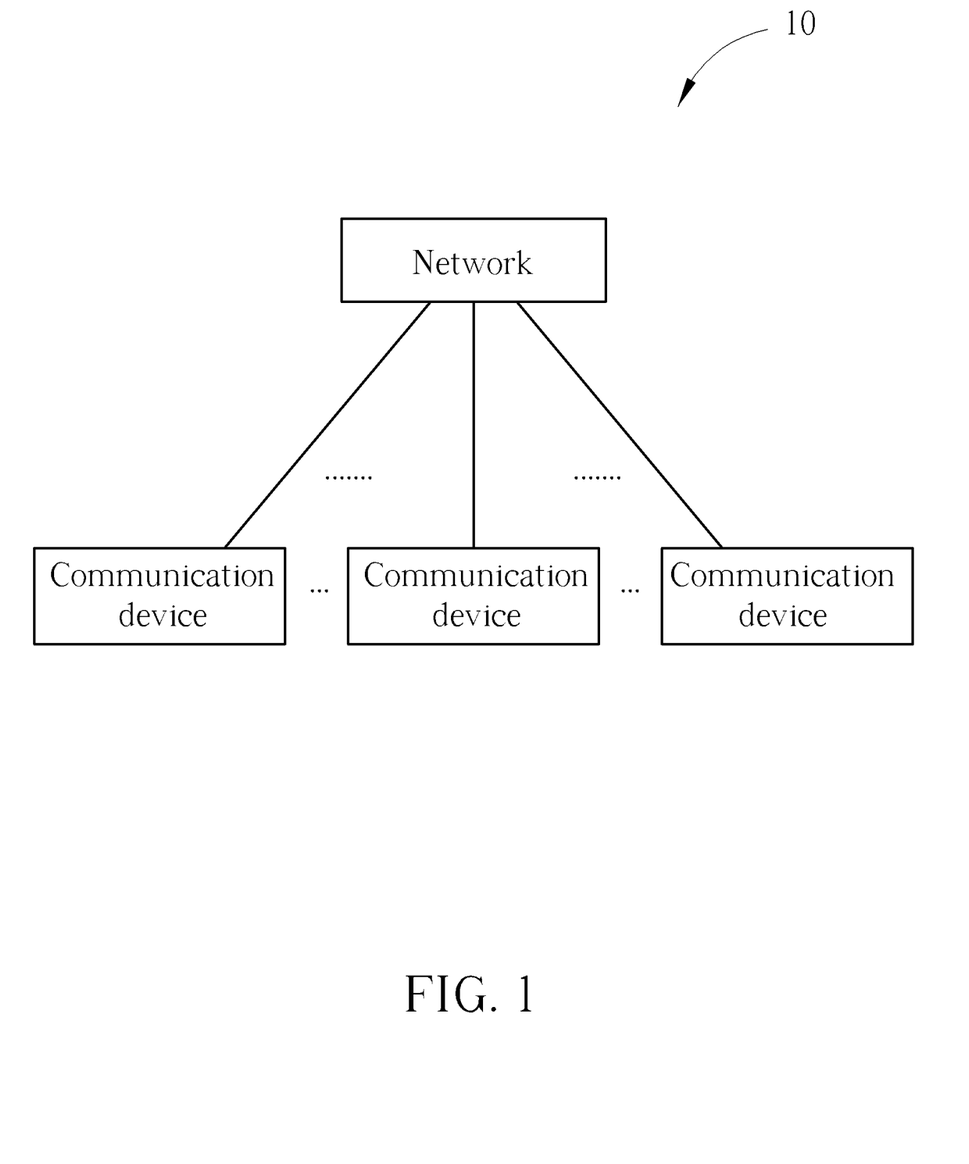
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may simultaneously communicate with each other via one or multiple cells (e.g., one or multiple carriers) belonging to one or multiple base stations (BSs). The abovementioned cells may be operated in the same or different duplexing modes, i.e., frequency-division duplexing (FDD), time-division duplexing (TDD) and flexible duplexing.

In FIG. 1, the network and the communication devices are simply utilized for illustrating the structure of the wireless communication system 10. Practically, the network may be an evolved universal terrestrial radio access network (E-UTRAN) including at least one evolved Node-B (eNB) in a long term evolution (LTE) system or an evolution of the LTE-A system. The network may be a fifth generation (5G, or called new radio (NR)) network including at least one 5G BS (e.g., gNB). The 5G network employs orthogonal frequency-division multiplexing (OFDM) and/or non-OFDM. The 5G network supports a transmission time interval (TTI) shorter than 1 ms (e.g., 1, 2, 3 or 4 OFDM symbols and 100 or 200 microseconds) and supports a system bandwidth wider than 20 MHz, to communicate with the communication devices. In general, a BS may also be used to refer any of the eNB and the 5G BS.

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
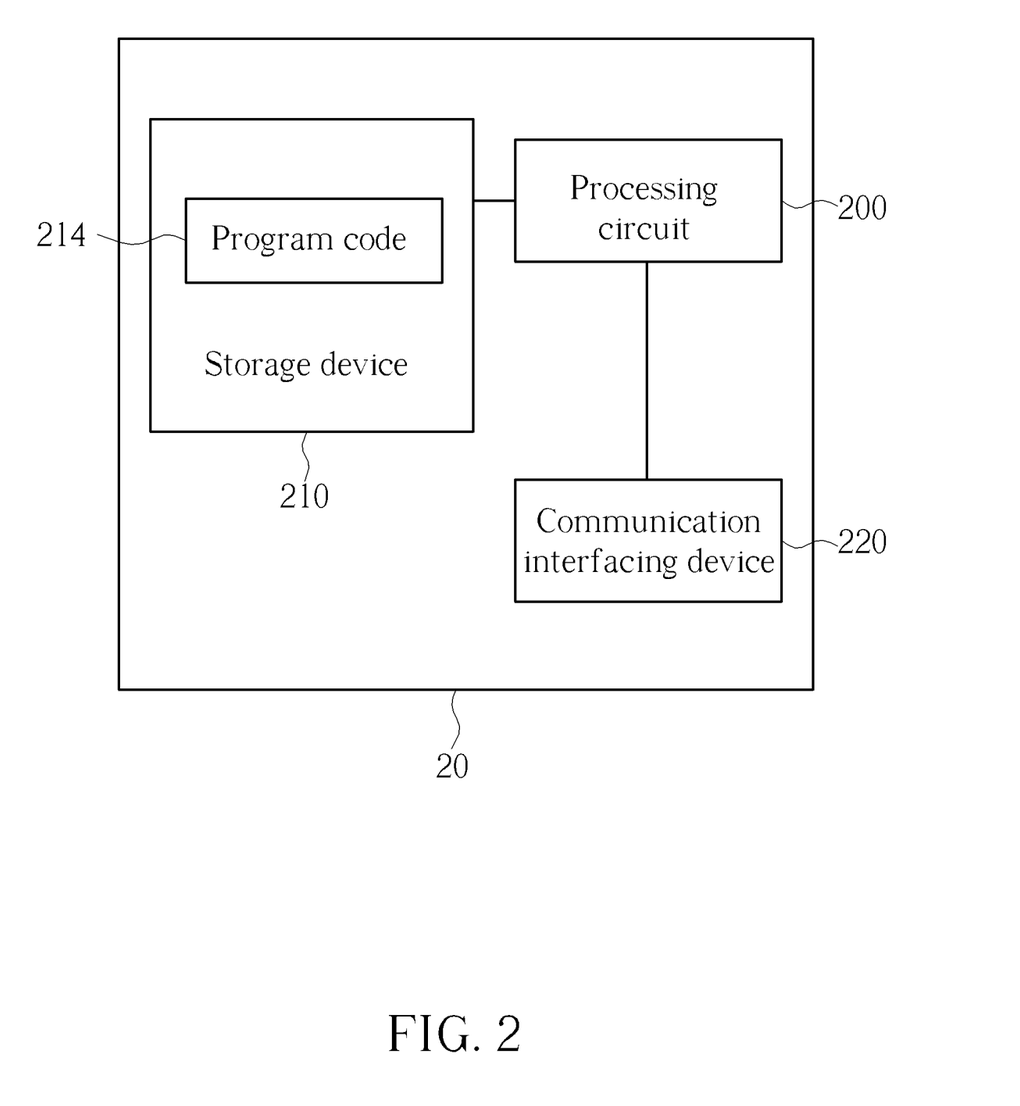
FIG. 2 is a schematic diagram of a communication device according to an example of the present invention.

FIG. 2 is a schematic diagram of a communication device 20 according to an example of the present invention. The communication device 20 may be the communication device or the network shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The communication interfacing device 220 includes at least one transceiver used to transmit and receive signals (e.g., data, messages and/or packets) according to processing results of the processing circuit 200. The BS may belong to (e.g., is managed/controlled by) the network to perform steps or instructions for realizing the following examples.

In the following examples, a UE is used for representing the communication device in FIG. 1, to simplify the illustration of the examples.

Figure 3:
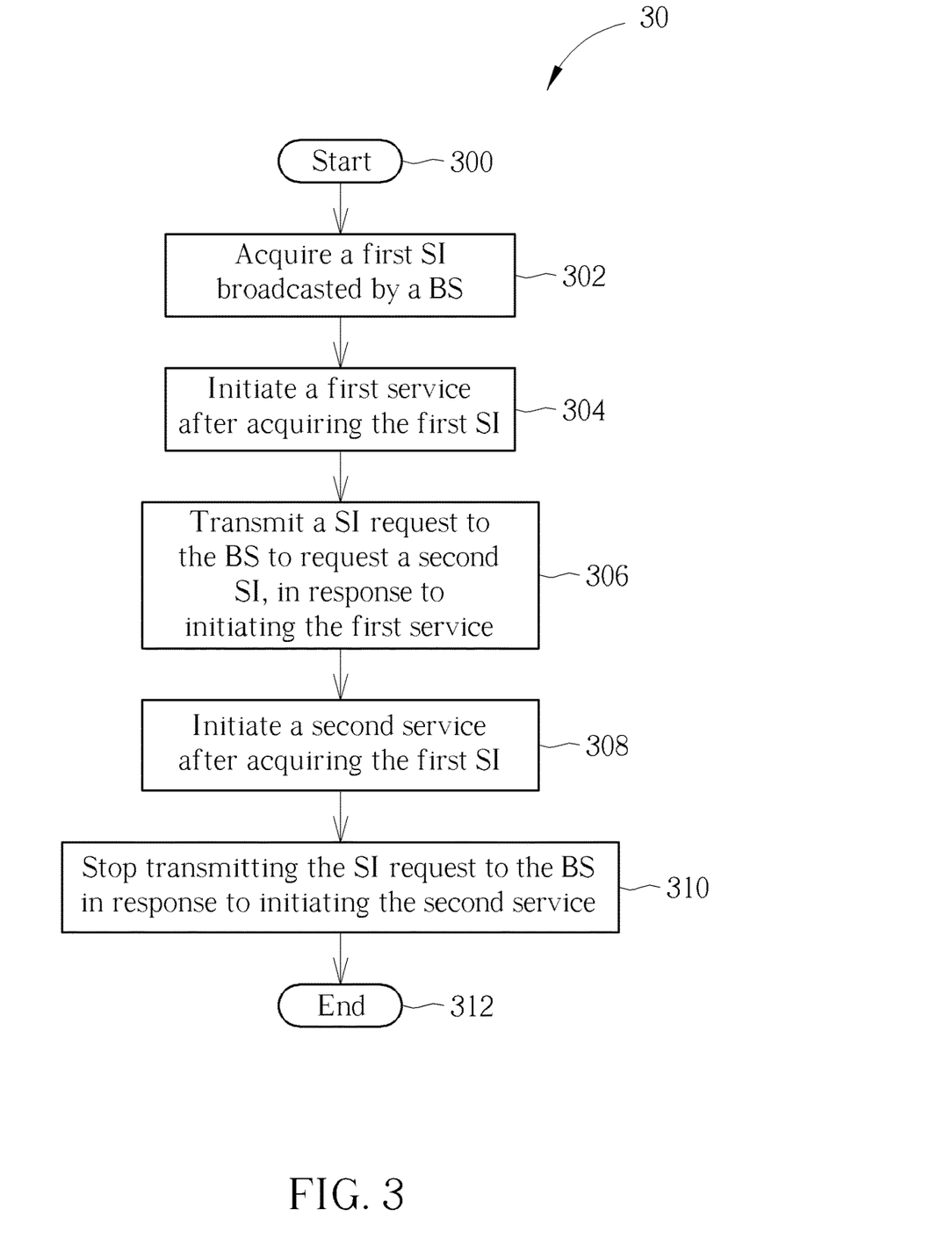
FIG. 3 is a flowchart of a process according to an example of the present invention.

FIG. 3 is a flowchart of a process 30 according to an example of the present invention. The process 30 may be utilized in a UE, to handle system information (SI). The process 30 includes the following steps:

Step 300: Start.
Step 302: Acquire a first SI broadcasted by a BS.
Step 304: Initiate a first service after acquiring the first SI.
Step 306: Transmit a SI request to the BS to request a second SI, in response to initiating the first service.
Step 308: Initiate a second service after acquiring the first SI.
Step 310: Stop transmitting the SI request to the BS in response to initiating the second service.
Step 312: End.

In one example, the BS transmits a SI response to the UE in response to the SI request. The SI response may include the second SI. In one example, the BS broadcasts the second SI in response to the SI request. After the UE receives the second SI, the UE transmits a RRC connection request for initiating the first service to the BS.

In one example, the first service includes (or is) a mobile originating call (e.g., voice call, short/multimedia message service, video call or location service). In one example, the second service includes a mobile terminating call (e.g., receiving a paging), a mobile originating signaling (e.g., tracking area update procedure) or an emergency call. In one example, the first service includes a messaging service (e.g., short/multimedia message service) and the second service includes a voice call.

In one example, the UE transmits the SI request to the BS, after completing the second service or after transmitting a message for initiating the second service to the BS.

Figure 4:
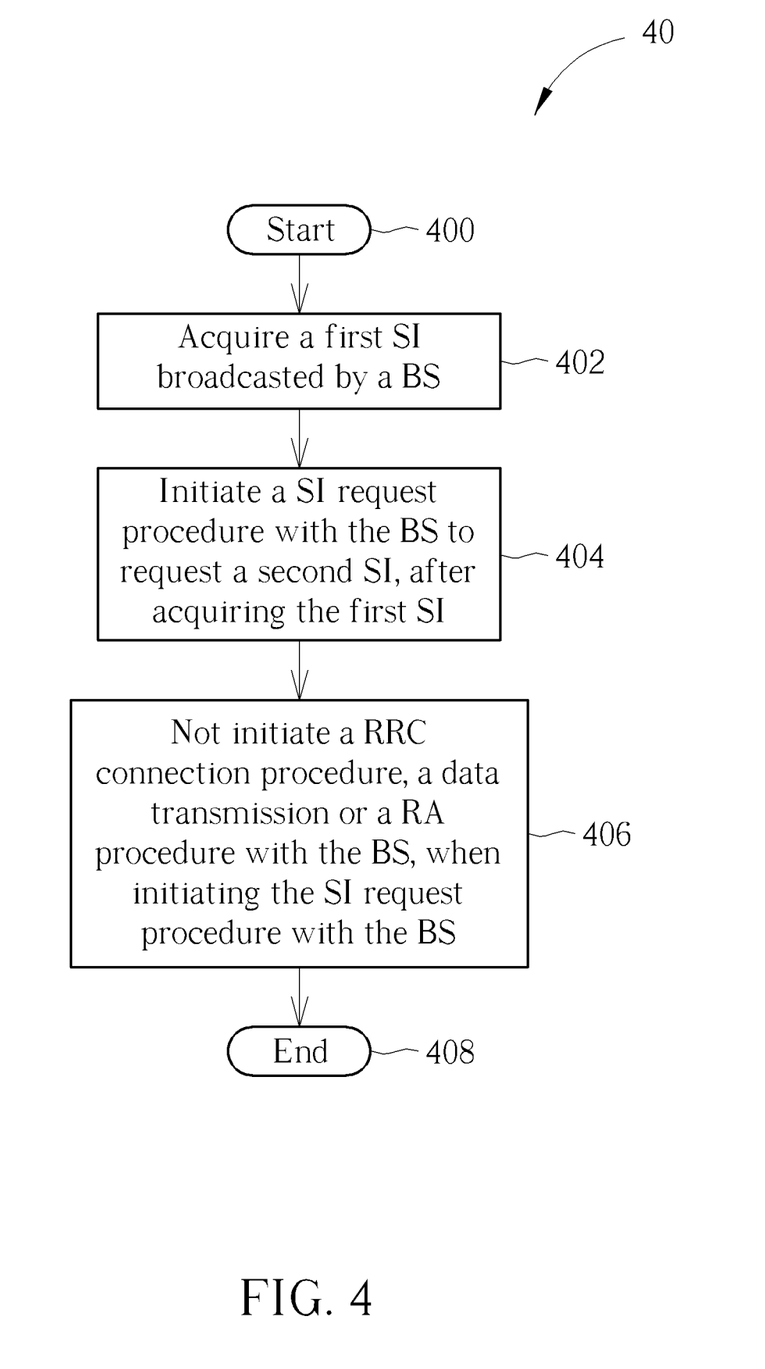
FIG. 4 is a flowchart of a process according to an example of the present invention.

FIG. 4 is a flowchart of a process 40 according to an example of the present invention. The process 40 may be utilized in a UE, to handle SI. The process 40 includes the following steps:

Step 400: Start.
Step 402: Acquire a first SI broadcasted by a BS.
Step 404: Initiate a SI request procedure with the BS to request a second SI, after acquiring the first SI.
Step 406: Not initiate a radio resource control (RRC) connection procedure, a data transmission or a random access (RA) procedure with the BS, when initiating the SI request procedure with the BS.
Step 408: End.

According to the process 40, the UE is forbidden or not allowed to initiate (or perform) the RRC connection procedure, the data transmission or the RA procedure, when the SI request procedure is initiated.

In one example, the UE initiates the RRC connection procedure, the data transmission or the RA procedure, when the UE does not initiate the SI request procedure, or after the UE completes the SI request procedure. In one example, the UE stops the RRC connection procedure, the data transmission or the RA procedure, when the UE initiates the SI request procedure (i.e., the SI request procedure is initiated).

In one example, the UE determines to transmit a SI specific preamble for the SI request procedure to the BS and not to transmit a RA preamble for the RA procedure to the BS. The UE may initiate another RA procedure for (in response to or triggered by) the SI request procedure.

Figure 5:
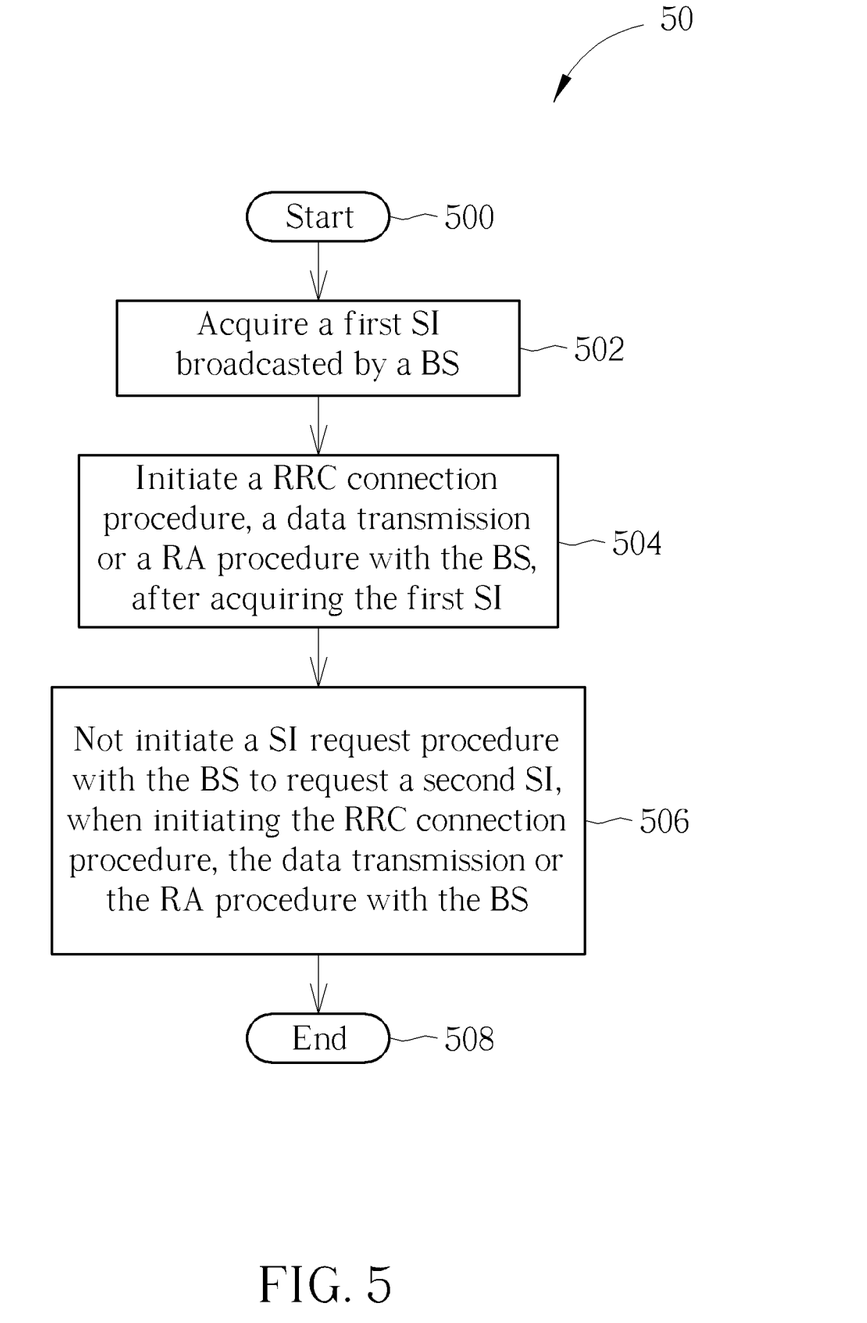
FIG. 5 is a flowchart of a process according to an example of the present invention.

FIG. 5 is a flowchart of a process 50 according to an example of the present invention. The process 50 may be utilized in a UE, to handle SI. The process 50 includes the following steps:

Step 500: Start.
Step 502: Acquire a first SI broadcasted by a BS.
Step 504: Initiate a RRC connection procedure, a data transmission or a RA procedure with the BS, after acquiring the first SI.
Step 506: Not initiate a SI request procedure with the BS to request a second SI, when initiating the RRC connection procedure, the data transmission or the RA procedure with the BS.
Step 508: End.

According to the process 50, the UE is forbidden or not allowed to initiate (or perform) the SI request procedure, when the RRC connection procedure, the data transmission or the RA procedure is initiated.

In one example, the UE initiates the SI request procedure, when the UE does not initiate the RRC connection procedure, the data transmission or the RA procedure, or after the UE completes the RRC connection procedure, the data transmission or the RA procedure. In one example, the UE stops the SI request procedure, when the UE initiates the RRC connection procedure, the data transmission or the RA procedure.

In one example, the UE initiates the RRC connection procedure due to initiating a Non-Access Stratum (NAS) procedure (e.g., service request procedure, tracking area update procedure, registration procedure), or due to initiating a service as described above.

In one example, the UE initiates the data transmission (i.e., transmit a Medium Access Control (MAC) Protocol Data Unit (PDU)) in response to a UL grant received from the BS. The BS may transmit the UL grant to the UE via (e.g., on or in) a physical DL control channel (PDCCH), a RRC message or the first SI. In one example, the UE initiates the data transmission to report a buffer status to the BS. The UE may report the buffer status to the BS, when the UE has data available for the data transmission in its buffer. In one example, the UE transmits a scheduling request when the UE initiates the data transmission, and suspends transmission of the scheduling request when the SI request procedure is initiated. The buffer status may be a MAC Control Element.

In one example, the UE determines to transmit a RA preamble for the RA procedure to the BS and not to transmit a SI specific preamble for the SI request procedure to the BS.

In one example, the UE initiates the RA procedure for (in response to or triggered by) a mobile originating call, a mobile originating signaling, or for responding a paging.

Figure 6:
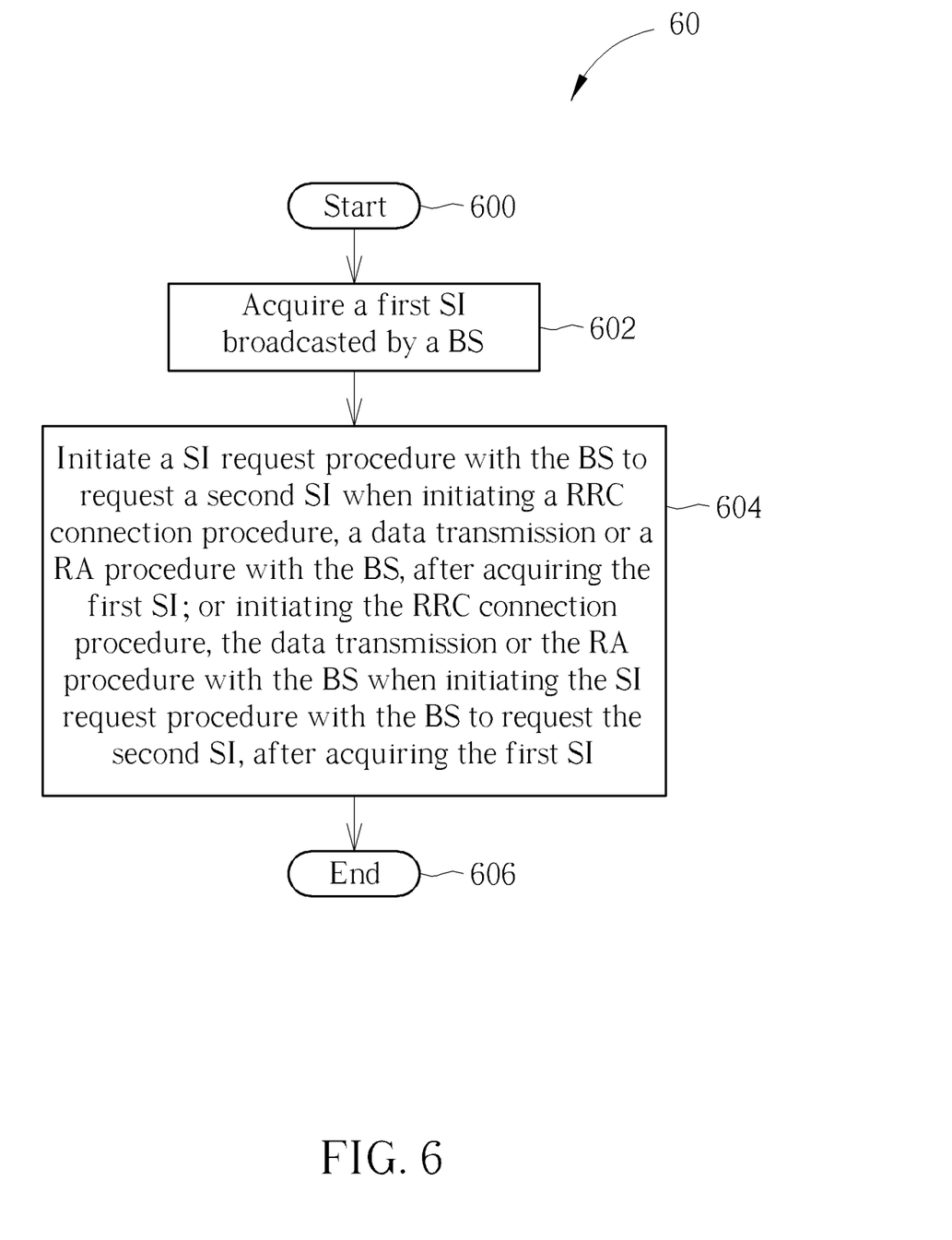
FIG. 6 is a flowchart of a process according to an example of the present invention.

FIG. 6 is a flowchart of a process 60 according to an example of the present invention. The process 60 may be utilized in a UE, to handle SI. The process 60 includes the following steps:

Step 600: Start.

Step 602: Acquire a first SI broadcasted by a BS.

Step 604: Initiate a SI request procedure with the BS to request a second SI when initiating a RRC connection procedure, a data transmission or a RA procedure with the BS, after acquiring the first SI; or initiating the RRC connection procedure, the data transmission or the RA procedure with the BS when initiating the SI request procedure with the BS to request the second SI, after acquiring the first SI.

Step 606: End.

According to the process 60, the UE can initiate (or perform) the SI request procedure and the RRC connection procedure simultaneously.

In one example, the UE initiates the SI request procedure by transmitting a SI request to the BS. In one example, the UE initiates the RRC connection procedure by transmitting a RRC connection request to the BS. In one example, the UE initiates the data transmission by transmitting data to the BS. In one example, the UE initiates the RA procedure by transmitting a RA preamble to the BS.

In one example, the UE transmits the SI request and the RRC connection request separately (e.g., at different time instants (e.g., different slots/subframes/mini-slots/OFDM symbols) and/or different frequency resources). For example, the UE transmits the SI request, after transmitting the RRC connection request and before receiving a RRC connection response responding the RRC connection request. The UE may transmit the SI request, after receiving the RRC connection response and before transmitting a RRC connection complete. The UE may transmit the RRC connection request, after transmitting the SI request and before receiving a SI response responding the SI request. The UE may transmit the RRC connection complete, after transmitting the SI request and before receiving the SI response.

In one example, the UE transmits the SI request and the data separately (e.g., at different time instants (e.g., different slots/subframes/mini-slots/OFDM symbols) and/or different frequency resources). For example, the UE transmits the SI request, after receiving a UL grant and before transmitting a MAC PDU. In one example, the UE transmits the MAC PDU including the SI request of the SI request procedure and a data block to the BS.

In one example, the UE transmits the SI request and the RA preamble separately (e.g., at different time instants (e.g., different slots/subframes/mini-slots/OFDM symbols) and/or different frequency resources). For example, the UE transmits the SI request, after transmitting the RA preamble and before receiving a RA response responding the RA preamble. The UE may transmit the SI request, after receiving the RA response and before transmitting a message 3 (MSG3) in response to the RA response. The UE may transmit the RA preamble, after transmitting the SI request and before receiving a SI response responding the SI request. The UE may transmit the MSG3, after transmitting the SI request and before receiving the SI response.

In one example, the UE transmits a MAC PDU including the SI request and the RRC connection request to the BS, to initiate the SI request procedure to request the second SI when initiating the RRC connection procedure. In one example, the UE transmits a MAC PDU including the SI request and the RRC connection complete to the BS, to initiate the SI request procedure to request the second SI when initiating the RRC connection procedure.

In one example, the UE transmits the RRC connection request to the BS and includes a field (or an Information Element (IE)) requesting the second SI in the RRC connection request, to initiate the SI request procedure to request the second SI when initiating the RRC connection procedure. In one example, the BS transmits the second SI in a RRC connection response responding the RRC connection request to the UE, in response to the field (or the IE). In one example, the BS broadcasts the second SI, in response to the field (or the IE).

In one example, the UE transmits a RRC connection complete to the BS and includes a field (or an IE) requesting the second SI in the RRC connection complete, to initiate the SI request procedure to request the second SI when initiating the RRC connection procedure. In one example, the BS transmits the second SI in a RRC Connection Reconfiguration message to the UE, in response to the field (or the IE). In one example, the BS broadcasts the second SI, in response to the field (or the IE).

Figure 7:
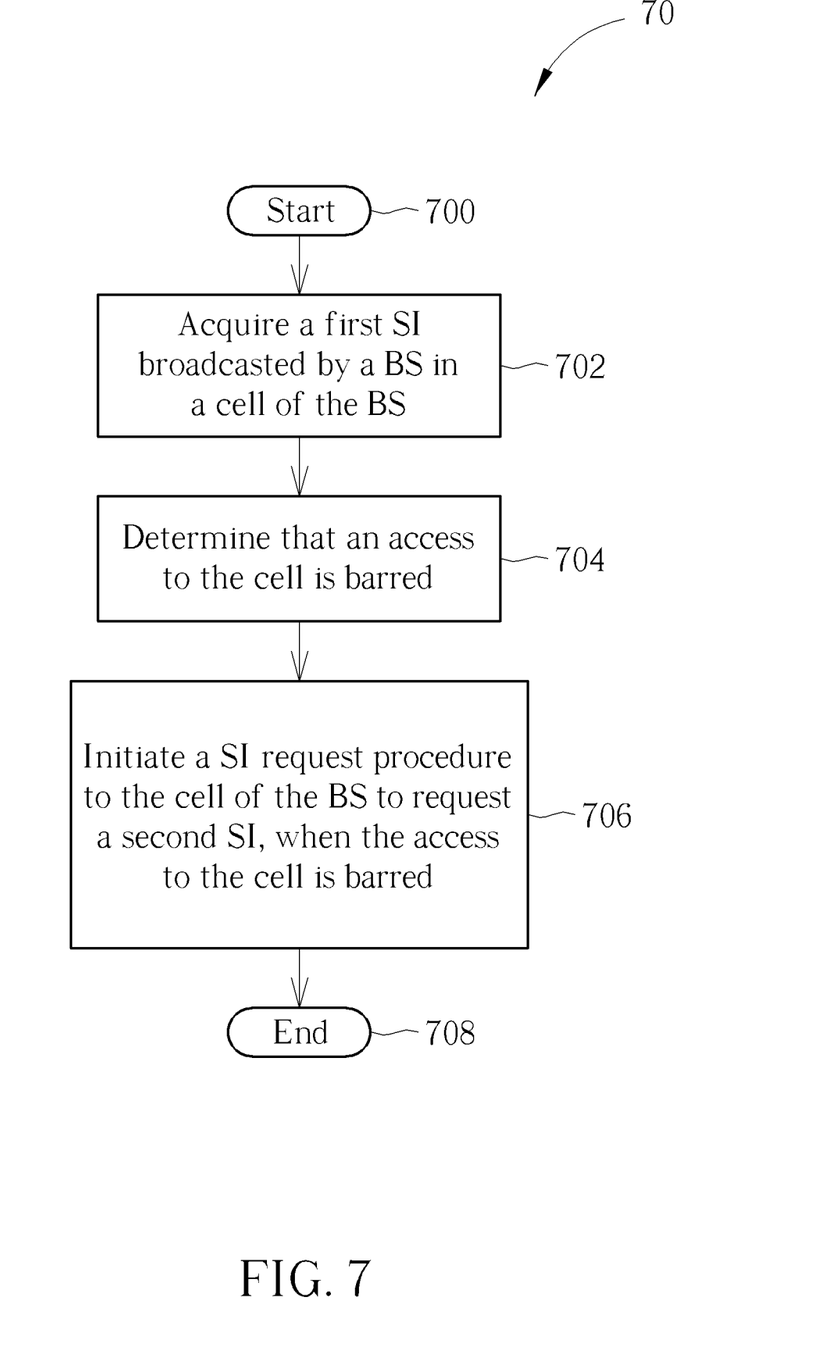
FIG. 7 is a flowchart of a process according to an example of the present invention.

FIG. 7 is a flowchart of a process 70 according to an example of the present invention. The process 70 may be utilized in a UE, to handle SI. The process 70 includes the following steps:

Step 700: Start.

Step 702: Acquire a first SI broadcasted by a BS in a cell of the BS.

Step 704: Determine that an access to the cell is barred.

Step 706: Initiate a SI request procedure to the cell of the BS to request a second SI, when the access to the cell is barred.

Step 708: End.

According to the process 70, the UE still can initiate (or perform) the SI request procedure to the cell of the BS to request the second SI, even if the access to the cell is barred. In other words, the situation that the access to the cell is barred can be ignored by the UE.

In one example, the UE determines that the access to the cell is barred according to the first SI broadcasted by the BS. In another example, the UE determines that the access to the cell is barred according to a reject message (e.g., RRC Connection Reject) received from the BS.

In one example, the UE determines not to initiate a RRC connection procedure (i.e., determines not to transmit a RRC connection request to the BS), when the access to the cell is barred.

Realization of the processes 30-70 above is not limited to the above description. The following examples may be applied to the above processes.

In one example, the BS allocates different resources (e.g., preamble, time and/or frequency resources) for the SI request procedure and the normal RA procedure (i.e., not for the SI request or not triggered by the SI request). In one example, the SI request is a SI specific preamble or a RA preamble transmitted by the UE via a SI specific time or frequency resource. The SI specific preamble, the SI specific time or frequency resource may be included in the first SI.

In the SI request procedure, the UE may transmit the SI request to the BS.

In one example, the SI request is a RA preamble configured specifically for the SI request. The BS may transmit a RA response in response to the RA preamble. The RA response may include the second SI. The BS may broadcast the second SI via a broadcast logical channel (BCCH) instead of including the second SI in the RA response. In this case, the RA response may not include the second SI.

In one example, the SI request is a RRC message (e.g., SI request message), a MAC control element or a RRC IE in a RRC message (e.g., a RRC Connection Request message, a RRC Connection Reestablishment Request message, a RRC Connection Resume Request message, a RRC Connection Setup Complete message, a RRC Connection Reestablishment Complete message, a RRC Connection Resume Complete message, a RRC Connection Reconfiguration Complete message, a measurement report).

The UE may transmit the RRC message via a first UL common control channel (CCCH), a first UL dedicated control channel (DCCH), a first UL specific logical channel (LC) or a second UL specific LC to the BS. The first UL CCCH, first UL DCCH and specific UL LC may have different logical channel identities (LCIDs) (i.e., different LCID values). In one example, the first UL specific LC is a second UL CCCH, and the second UL specific LC is a second UL DCCH.

In one example, the UE (is only allowed to) transmit the SI request via the first UL CCCH or the first UL specific LC to the BS, when the UE is in a RRC IDLE state or in a RRC INACTIVE state. The BS may transmit the SI response (or the second SI) via a first DL CCCH or a first DL specific LC (e.g., in a message 4 (MSG4) of the RA procedure) in response to the SI request. In one example, the BS transmits (or broadcasts) the second SI via the BCCH in response to the SI request. For example, the UE generates a MAC PDU including a first MAC service data unit (SDU) and a subheader of the first MAC SDU, wherein the first MAC SDU comprises (e.g., is, includes or contains) the SI request and the subheader includes a LCID of the first UL CCCH or a LCID of the first UL specific LC. The UE may transmit the MAC PDU to the BS. The BS may generate a first MAC PDU including a MAC SDU and a subheader of the MAC SDU, wherein the MAC SDU includes the SI response and the subheader includes a LCID of the first DL CCCH or a LCID of the first DL specific LC. The BS may transmit the first MAC PDU to the UE. In case the second SI is transmitted via the BCCH, the BS may generate a second MAC PDU including the second SI and not including a LCID of the BCCH. The BCCH may be indicated in the second SI or in a container message containing the second SI. The BS may transmit (broadcast) the second MAC PDU. In one example, the BS generates a third MAC PDU including a MAC SDU and a subheader of the MAC SDU, wherein the MAC SDU includes the second SI and the subheader includes a LCID of the BCCH. The BS may transmit (broadcast) the third MAC PDU.

If the UE includes a RRC connection request in the MAC PDU in addition to the SI request, the MAC PDU generated by the UE may further include a second MAC SDU and a subheader of the second MAC SDU, wherein the second MAC SDU includes the RRC Connection Request and the subheader includes the LCID of the first UL CCCH. Then, the first MAC PDU generated by the BS may further include a MAC SDU and a subheader of the MAC SDU, wherein the MAC SDU includes a RRC connection response responding the RRC connection request and the subheader includes a LCID of the first DL CCCH. In case the second SI is transmitted via the BCCH, the BS may generate a fourth MAC PDU including a MAC SDU and a subheader of the MAC SDU, wherein the MAC SDU includes the RRC Connection Response and the subheader includes a LCID of the first DL CCCH. The BS transmits the fourth MAC PDU to the UE.

In one example, the UE (is only allowed to) transmits the SI request via the first UL DCCH or the second UL specific LC to the BS, when the UE is in a RRC CONNECTED state or in a RRC INACTIVE state. The BS may transmit the SI response (or the second SI) via a first DL DCCH or a second DL specific LC in response to the SI request. Alternatively, the BS transmits (or broadcasts) the second SI via the BCCH in response to the SI request. For example, the UE generates a MAC PDU including a first MAC SDU and a subheader of the first MAC SDU, wherein the first MAC SDU comprises (e.g. is, includes or contains) the SI request and the subheader includes a LCID of the first UL DCCH or a LCID of the second UL specific LC. The UE may transmit the MAC PDU to the BS. The BS may generate a first MAC PDU which includes a MAC SDU and a subheader of the MAC SDU, wherein the MAC SDU includes the SI response and the subheader includes a LCID of the first DL DCCH or a LCID of the second DL specific LC. The BS may transmit the first MAC PDU to the UE. In case the second SI is transmitted via the BCCH, the BS may generate a second MAC PDU which includes the second SI and does not include a LCID of the BCCH. The BCCH may be indicated in the second SI or in a container message containing the second SI. The BS transmits (broadcasts) the second MAC PDU. In one example, the BS generates a third MAC PDU including a MAC SDU and a subheader of the MAC SDU, wherein the MAC SDU includes the second SI and the subheader includes a LCID of the BCCH. The BS transmits (broadcasts) the third MAC PDU.

The UE may transmit the SI request in a MSG3 of a RA procedure to the BS. For example, the UE in the RRC IDLE state or RRC INACTIVE state transmits the SI request via time and/or frequency resources (i.e., physical resource blocks (PRBs)) configured by a UL grant in the RA response of the RA procedure. In case the BS transmits the second SI via the BCCH in response to the SI request, the BS may transmit a MSG4 in response to the MSG3 for the UE to complete the RA procedure, or the BS does not transmit the MSG4.

The UE may transmit the SI request to the BS in a physical UL shared channel (PUSCH) transmission which is not the MSG3 of the RA procedure. For example, the UE in the RRC CONNECTED state does not perform the RA procedure to transmit the SI request. The UE may transmit the SI request to the BS via time and/or frequency resources (i.e., PRBs) configured by a UL grant received via a PDCCH from the BS. The UL grant may be included in a DL control information (DCI) scrambled by a Cell Radio Network Temporary Identifier (C-RNTI) of the UE.

The first SI and the second SI may be different. The BS may indicate that the SI request procedure is allowed or not in the first SI. The UE may initiate the SI request procedure, when the first SI indicates that the SI request procedure is allowed. The UE may not initiate the SI request procedure, when the first SI indicates that the SI request procedure is not allowed.

In one example, the first SI includes at least one of physical layer information of a cell (e.g., system bandwidth), a TDD configuration, a first scheduling period, a second scheduling period, a beam configuration, information about whether a UE is allowed to access a cell, scheduling information of other SIB (s), common channel information, shared channel information and cell re-selection information.

In one example, the second SI includes cell re-selection information for other radio access technology, a public warning service message, Multimedia Broadcast/Multicast Service (MBMS) related information, information related to mobility procedures for MBMS reception, a MBMS configuration, a sidelink configuration, a vehicle to everything (V2X) configuration, information related to GPS time and/or Coordinated Universal Time (UTC), information related to SC-PTM, information about Extended Access Barring for access control or information related to a Wireless Local Area Network (WLAN).

In one example, the first SI includes a master information block (MIB) and at least one SIB. The at least one first SIB may include a SIB type 1 (SIB1). In one example, the second SI includes at least one second SIB.

In one example, the data of the data transmission is a MAC PDU, a MAC SDU, a Radio Link Control (RLC) PDU, a Packet Data Convergence Protocol (PDCP) PDU, a RRC message (e.g., measurement report, UL information transfer message, UE capability information message, UE information response message or MBMS interest indication message) or a NAS message.

In one example, the UE initiates the RA procedure due to initiating the RRC connection procedure. In one example, the UE initiates the RA procedure due to receiving a handover command from other BS or receiving a PDCCH order from the BS. When initiating the RA procedure, the UE transmits a RA preamble to the BS. The RA procedure may be a 2-step RA procedure or a 4-step RA procedure.

In one example, the RRC connection procedure includes (or is) a RRC connection establishment procedure, a RRC connection re-establishment procedure or a RRC connection resume procedure.

In one example, the RRC connection request includes (or is) a RRC Connection Request message, a RRC Connection Reestablishment Request message or a RRC Connection Resume Request message. In one example, the RRC connection response includes (or is) a RRC Connection Setup message, a RRC Connection Reestablishment message or a RRC Connection Resume message. In one example, the RRC connection complete includes (or is) a RRC Connection Setup Complete message, a RRC Connection Reestablishment Complete message or a RRC Connection Resume Complete message.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and related communication device for handling SI. Thus, the UE knows how (e.g., when) to requests other SI from the network. Thus, the problem of the communication performed with the other SI between the UE and the network is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device of handling system information (SI), comprising:
   a storage device, for storing instructions; and
   a processing circuit, coupled to the storage device, wherein the processing circuit is configured to execute the instructions of:
   acquiring a first SI broadcasted by a base station (BS);
   initiating a first service after acquiring the first SI;
   transmitting a SI request to the BS to request a second SI, in response to initiating the first service;
   initiating a second service after acquiring the first SI; and
   stopping transmitting the SI request to the BS in response to initiating the second service.

2. The communication device of claim 1, wherein the first service comprises a mobile originating call, and the second service comprises a mobile terminating call, a mobile originating signaling or an emergency call; or the first service comprises a messaging service, and the second service comprises a voice call.

3. The communication device of claim 1, wherein the storage device further stores an instruction of:
   transmitting the SI request to the BS, after completing the second service or after transmitting a message for initiating the second service to the BS.

4. A communication device of handling system information (SI), comprising:
   a storage device, for storing instructions; and
   a processing circuit, coupled to the storage device, wherein the processing circuit is configured to execute the instructions of:
   acquiring a first SI broadcasted by a base station (BS);
   initiating a SI request procedure with the BS to request a second SI, after acquiring the first SI;
   being forbidden to initiate a radio resource control (RRC) connection procedure, a data transmission or a random access (RA) procedure with the BS, when initiating the SI request procedure with the BS; and initiating the RRC connection procedure, the data transmission or the RA procedure, when the communication device does not initiate the SI request procedure, or after the communication device completes the SI request procedure.

5. The communication device of claim 4, wherein the storage device further stores an instruction of:
stopping the RRC connection procedure, the data transmission or the RA procedure, when the communication device initiates the SI request procedure.

6. The communication device of claim 4, wherein the storage device further stores an instruction of:
determining to transmit a SI preamble for the SI request procedure to the BS and not to transmit a RA preamble for the RA procedure to the BS.

7. A communication device of handling system information (SI), comprising:
a storage device, for storing instructions; and
a processing circuit, coupled to the storage device, wherein the processing circuit is configured to execute the instructions of:
acquiring a first SI broadcasted by a base station (BS);
initiating a radio resource control (RRC) connection procedure, a data transmission or a random access (RA) procedure with the BS, after acquiring the first SI;
being forbidden to initiate a SI request procedure with the BS to request a second SI, when initiating the RRC connection procedure, the data transmission or the RA procedure with the BS; and
initiating the SI request procedure, when the communication device does not initiating the RRC connection procedure, the data transmission or the RA procedure, or after the communication device completes the RRC connection procedure, the data transmission or the RA procedure.

8. The communication device of claim 7, wherein the storage device further stores an instruction of:
stopping the SI request procedure, when the communication device initiates the RRC connection procedure, the data transmission or the RA procedure.

9. The communication device of claim 7, wherein the communication device initiates the data transmission in response to an uplink (UL) grant received from the BS, or to report a buffer status to the BS.

10. The communication device of claim 7, wherein the storage device further stores an instruction of:
determining to transmit a RA preamble for the RA procedure to the BS and not to transmit a SI preamble for the SI request procedure to the BS.

11. A communication device of handling system information (SI), comprising:
a storage device, for storing instructions; and
a processing circuit, coupled to the storage device, wherein the processing circuit is configured to execute the instructions of:
acquiring a first SI broadcasted by a base station (BS); and
initiating a SI request procedure to request a second SI with the BS when initiating a radio resource control (RRC) connection procedure or a data transmission with the BS, after acquiring the first SI; or initiating the RRC connection procedure or the data transmission with the BS when initiating the SI request procedure to request the second SI with the BS, after acquiring the first SI.

12. The communication device of claim 11, wherein the communication device initiates the SI request procedure by transmitting a SI request to the BS, initiates the RRC connection procedure by transmitting a RRC connection request to the BS or initiates the data transmission by transmitting data to the BS.

13. The communication device of claim 12, wherein the SI request and one of the RRC connection request and the data are transmitted separately.

14. The communication device of claim 11, wherein the communication device transmits a Medium Access Control (MAC) Protocol Data Unit (PDU) comprising the SI request and the RRC connection request to the BS, to initiate the SI request procedure to request the second SI when initiating the RRC connection procedure.

15. The communication device of claim 11, wherein the communication device transmits the RRC connection request to the BS and comprises a field requesting the second SI in the RRC connection request, to initiate the SI request procedure to request the second SI when initiating the RRC connection procedure.

16. A communication device of handling system information (SI), comprising:
a storage device, for storing instructions; and
a processing circuit, coupled to the storage device, wherein the processing circuit is configured to execute the instructions of:
acquiring a first SI broadcasted by a base station (BS) in a cell of the BS;
determining that an access to the cell is barred; and
initiating a SI request procedure to the cell of the BS to request a second SI, when the access to the cell is barred.

17. The communication device of claim 16, wherein the communication device determines that the access to the cell is barred according to the first SI broadcasted by the BS or a reject message received from the BS.

18. The communication device of claim 16, wherein the storage device further stores an instruction of:
determining not to initiate a RRC connection procedure, when the access to the cell is barred.

* * * * *